Figure 1:
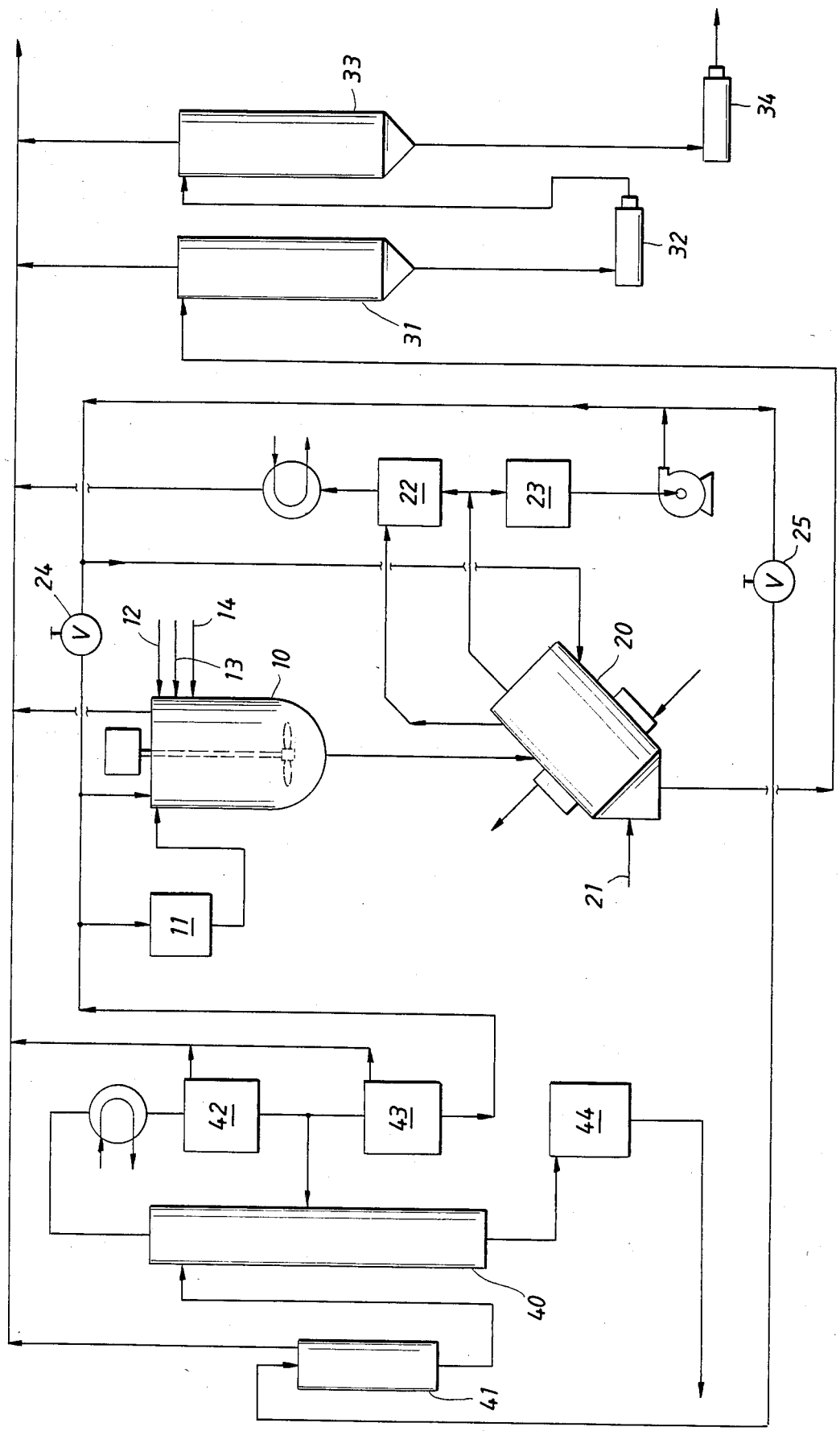

United States Patent [19]

Brons et al.

[11] Patent Number: 4,798,884

[45] Date of Patent: Jan. 17, 1989

[54] PROCESS FOR THE WORKING-UP OF ETHYLENE/CARBON MONOXIDE ALTERNATING COPOLYMERS

[75] Inventors: Henricus M. J. Brons; Maarten M. Geuze, both of Amsterdam, Netherlands

[73] Assignee: Shell Oil Company, Houston, Tex.

[21] Appl. No.: 945,594

[22] Filed: Dec. 23, 1986

[30] Foreign Application Priority Data

Dec. 23, 1985 [NL] Netherlands ......................... 8503545

[51] Int. Cl.$^4$ ............................................. C08G 67/02
[52] U.S. Cl. .................................... 528/491; 528/392;
528/492; 528/493; 528/494; 528/495; 528/497;
528/498; 528/499
[58] Field of Search ............... 528/392, 493, 495, 494,
528/491, 492, 497, 498, 499

[56] References Cited

U.S. PATENT DOCUMENTS

| | | | |
|---|---|---|---|
| 3,010,952 | 12/1961 | Lovett et al. | 260/93.7 |
| 3,192,192 | 7/1965 | Hartnett | 260/93.7 |
| 3,240,774 | 3/1966 | Joyner et al. | 260/94.9 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,984,388 | 10/1976 | Shrene et al. | 260/63 |
| 4,024,326 | 5/1977 | Hudgin | 526/11.1 |
| 4,076,911 | 2/1978 | Fenton | 526/11.1 |
| 4,251,340 | 2/1981 | Johnson et al. | 528/392 |
| 4,473,482 | 9/1984 | Serres et al. | 526/230 |

FOREIGN PATENT DOCUMENTS

| | | |
|---|---|---|
| 847733 | 6/1960 | European Pat. Off. . |
| 0121965 | 10/1984 | European Pat. Off. . |
| 0181014 | 5/1986 | European Pat. Off. . |
| 1420726 | 6/1961 | Fed. Rep. of Germany . |
| 2046968 | 2/1968 | Japan . |
| 1081304 | 8/1967 | United Kingdom . |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397-402.
J. Am. Chem. Soc. 1982, 104, 3520-2.
Organometallics 1984, 3, 866-870.
Proc. Ind. Assoc. Cult. Sci. 1985, 68B, 1-5.
CHEMTECH 1986, 1, 48-51.
Adv. Polym. Sci. 1986, 73-4, 125-44.
Polym. Lett. 1965, 3, 703-7.
Chim. Ind. 1971, 53, 939-40.
J. Mol. Catal. 1983, 18, 117-25.
J. Organomet Chem. 1985, 279, C5-C10.

*Primary Examiner*—Harold D. Anderson

[57] ABSTRACT

The invention is a process for working up a linear alternating copolymer of carbon monoxide, ethylene and optionally at least one olefinically unsaturated hydrocarbon, which process comprises contacting the copolymer with an organic solvent in the absence of molecular oxygen and under conditions effective to reduce the amount of impurities in the copolymer, and drying the copolymer in the absence of molecular oxygen.

9 Claims, 1 Drawing Sheet

PROCESS FOR THE WORKING-UP OF ETHYLENE/CARBON MONOXIDE ALTERNATING COPOLYMERS

FIELD OF THE INVENTION

The invention relates to a process for working up linear, alternating copolymers of carbon monoxide and ethylene. The invention also relates to a process for working up linear alternating copolymers of carbon monoxide, ethylene and at least one olefinically unsaturated hydrocarbon.

BACKGROUND OF THE INVENTION

Polymers of carbon monoxide and olefins, such as ethylene, have been known and available in limited quantities for many years. For example, polyketones are disclosed in *Kirk-Othmer Encyclopedia of Chemical Technology*, Second Edition, Vol. 12, p. 132, 1967, and in *Encyclopedia of Polymer Science and Technology*, 1968, Vol. 9, 397-402. The low molecular weight copolymers in particular may be used as intermediates for the production of plastics, as components in blends with other polymers (such as waxes and greases) and as pour-point depressants for middle distillate petroleum fuel products. The higher molecular weight polymers have use and utility as premium thermoplastics for fibers, films, injection molding, compression molding or blowing applications.

High molecular weight linear polymers of carbon monoxide and ethylene in which monomer units occur in alternating order and which polymers consist of units of the formula

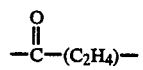

can be prepared by using Group VIII metal organic phosphine compounds as a catalyst, such as palladium organic phosphine compounds. For example U.K. Pat. No. 1,081,304, U.S. Pat. No. 3,689,460, and U.S. Pat. No. 3,694,412 disclose processes using palladium catalysts having monodentate alkyl phosphine ligands. Similar palladium catalysts having monodentate phosphine ligands are disclosed in the articles found in *J. Am. Chem. Soc.* 1982, 104, 3520-2, *Organometallics* 1984, 3, 866-70, *Proc. Ind. Assoc. Cult. Sci.* 1985, 68B, 1-5 and *CHEMTECH* 1986, 1, 48-51. European Patent Application No. 121,965 discloses a process for polymerizing CO and an alkenically unsaturated hydrocarbon using a Group VIII metal complex having bidentate phosphorous, arsenic or antimony ligands. Application of these catalysts to a monomer mixture which, in addition to carbon monoxide and ethylene, comprises at least one olefinically unsaturated hydrocarbon having the general formula $C_xH_y$, which hydrocarbon has fewer than 20 carbon atoms and contains an olefinically unsaturated —CH=CH— group, leads to the formation of polymers with units of the formula

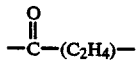

and units of the general formula

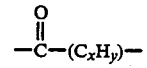

occurring randomly distributed within the polymer. The structure of the copolymers and "terpolymers" differs only in that in the case of the "terpolymers" a unit of

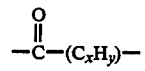

is encountered at some random places in the polymer instead of a unit of

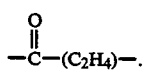

The polymers have excellent mechanical properties; especially, very high strength, rigidity and impact resistance. Despite the fact that they can be prepared fairly simply from very cheap raw materials with the aid of a suitable catalyst, problems with processing these copolymers have limited their practical application up to now. This is mainly due to their high melting point of about 257° C. and the consequent problems in processing them. The processing of these copolymers by, for example, injection molding, should be carried out in a molten state with the material being at a temperature of at least 25° C. above its melting point, in this case at a temperature of above 280° C. It has been found that these copolymers are not sufficiently resistant to such high temperatures; they discolour and decompose. Lower melting points and consequently improved processability in the melt can be obtained by incorporating a second unsaturated monomer in the molecular chains, for example propylene.

However, there is a second factor that has an unfavourable influence on the processability of the copolymers at the melt temperature. This is the fact that copolymers that can be obtained by the possible catalytic copolymerization processes will always contain a certain amount of impurities, such as catalyst residues, copolymer with a relatively low molecular weight, oligomers, water and solvent residues. The last of these will not, of course, be present if gas-phase copolymerization is employed, but will be present if suspension methods are used. The presence of these impurities means that when heating to melt temperature, the volatile impurities contained in the copolymer are released as gaseous products in amounts that are greater than can be tolerated in customary devolatilizing extruders. This quantity can be estimated at about 3%w.

There is therefore a need for a working-up method which can provide sufficient purification of the copolymers. More in particular, there is a need to provide copolymers of carbon monoxide, ethylene and optionally at least one olefinically unsaturated hydrocarbon that contain no more than 3%w of the impurities (a) water, (b) organic solvent and (c) by-products that escape in the gaseous state on heating to the melt temperature of the copolymer. Said upper limit is a total content of the impurities (a), (b) and (c) together.

SUMMARY OF THE INVENTION

The invention is a process for working up a linear alternating copolymer of carbon monoxide, ethylene and optionally at least one olefinically unsaturated hydrocarbon, which process comprises contacting the copolymer with an organic solvent in the absence of molecular oxygen and under conditions effective to reduce the amount of impurities in the copolymer, and drying the copolymer in the absence of molecular oxygen.

DESCRIPTION OF THE INVENTION

In a preferred embodiment, of the process according to the invention drying of the copolymer is carried out in the absence of water and in the absence of oxygen. The absence of molecular oxygen can suitably be effected by maintaining an atmosphere of an inert gas, preferably nitrogen, in the washing and drying equipment. If this gas is dried, the afore-mentioned preferred condition will also be satisfied. Other suitable gases are carbon dioxide and carbon monoxide, the latter only in the absence of ethylene if the copolymer still contains active catalyst.

Washing and drying can be carried out continuously or semicontinuously in successive units. Batchwise execution is preferred, however, since it is then possible to use the same equipment both for washing and for drying. It may alsobe advantageous to perform the drying, or the washing and drying, at a pressure which is substantially lower than the pressure in the copolymerization reactor, preferably 3.5 MPa lower.

The expression "in the absence of molecular oxygen" means that the partial oxygen pressure must be less than $5 \times 10^{-3}$ MPa, preferably less than $2 \times 10^{-3}$ MPa. These values are independent of the total pressure in the vapor phase during washing or drying. The expression "in the absence of water" means the exclusion of quantities of water which, if present during drying, would raise the relative water content in the copolymer by 20%. Volatile impurities in the copolymer are those impurities that are present in the gaseous or vapor state when the copolymer is heated, such as during melt processing of the copolymer. Examples of the volatile impurities in the copolymer are water, low molecular weight copolymer, oligomers and solvent residues.

The term "drying" is understood below to comprise two successive steps, viz. first a liquid-solid phase separation, such as settling, filtration or centrifugation, and secondly the removal of solvent residues from the wet copolymer by heating, preferably to a temperature of at least (T-30)°C., where T is the boiling point in °C. of the solvent at the prevailing pressure. Between both steps, moreover, the still wet copolymer mass can be compressed in order to reduce its water content. Filtration is the most suitable technique for the phase separation. Phase separation, compression and drying by heating are advantageously carried out in a single unit, preferably in the same equipment as the washing was carried out. Suitable equipment with the appropriate combination of functions is commercially available: the WEGA filter-driers made by SEITZ-ENZINGER-NOLL, A. G. and filter-driers made by ROSEMUND GmbH, and by SCHENK GmbH. The WEGA unit is extremely attractive because its tilting facility simplifies the batchwise performance of successive washing, filtering, compacting and drying.

The washing agent is, usually for the sake of convenience, also the polymerization agent for suspension polymerization and can be recovered from the used washing liquid by distillation. The impurities from the copolymers are then discharged from the working-up and production process mainly as bottom product. This discharge takes place in compliance with the standards laid down in environmental legislation, and may be taken care of by waste-disposal or incineration firms. This last step may be combined with the recovery of catalyst.

A particularly suitable embodiment of the process according to the invention will now be described with refernce to a process scheme (FIG. 1). Methanol is here employed as washing liquid and as copolymerization medium.

Copolymerization is carried out in a stirred reactor 10 at a pressure of 5 MPa and a temperature of 65° C. A palladium phosphine catalyst is dissolved in methanol delivered from storage vessel 11, ethylene and carbon monoxide via lines 12 and 13, and possibly also propylene via line 14. Ethylene under pressure is available from a naphtha cracker, carbon monoxide is available as bottled gas, so that no compressors are needed for either reactants. Propylene is pressurized by a liquid pump. Methanol is introduced, then the reactor is pressurized by the addition of the monomers and carbon monoxide. Catalyst solution is subsequently added, and, while making up with monomers and carbon monoxide, copolymerization is carried out until a batch of copolymer (15%w solid copolymer, calculated on the total of copolymer plus methanol) is obtained. The supply of reactants is then stopped and the pressure released, the residual gas being flared off. The copolymerization suspension is transferred to a WEGA filter-drier 20. The following steps are carried out in succession: filtration, several washings with methanol, filtration, and drying at 70° to 80° C., which temperature increase is obtained by circulating hot water through an external heating jacket. All these steps are carried out under a dried nitrogen atmosphere which is introduced via line 21 and discharged to the flare via vessel 22. Any extrained methanol vapor is condensed and transferred via vessel 22 to vessel 23. This latter vessel also receives using washing liquid. The washing liquid can, via a short recycling line, when valves 24 and 25 are closed, be used for subsequent washings.

Dry copolymer is transferred by a powder conveyor (not shown) as a gas/solid mixture via cyclone 31 and possibly via a silo (not shown) to degassing extruder 32. Discharged gas leaves cyclone 31 for the flare line. The extruder processes the polymer to granulate (nibs). This is transported by a granulate conveyor (not shown), preferably under nitrogen, via cyclone 33 to unit 34. The latter unit may be a bag-filling machine, but may also be an injection-molding unit for manufacturing shaped finished products, a film-blowing unit for film or thicker sheet or strip material, a spinning machine for fibres, a blow-moulding unit for bottles or other containers, an extrusion unit for strips, sheets, pipes or sections, or other suitable shaping equipment. In this way, the entire working-up cycle from copolymerization product issuing from the reactor to finished product can take place under a nitrogen atmosphere and also, if desired, under exclusion of water. Units 32, 33 and 34 can be omitted if dry powder is supplied to the customer.

Contaminated methanol is pumped from vessel 23 to storage vessel 41 and then distilled in tower 40. Distilled methanol passes via reflux vessel 42 into storage vessel 43. This is discharged via a line connected to the methanol supply to catalyst vessel 1, to reactor 10 and to filter drier 20. The discharge of distilled methanol from reflux vessel 42 is only partial, the remaining methanol returns as reflux to distillation tower 40. Vessels 41, 42 and 43 vent to the flare line. Contaminated bottom product is discharged from the distillation tower 40 to storage vessel 44. Final discharge of bottom product from the process takes place in accordance with statutory environmental legislation. The following contaminants at least are present: catalyst residues, oligomers and water. This last-mentioned product probably arises during the copolymerization by condensation with elimination of water from hydroxyl groups attached to the molecular chains (enol configuration). The copolymer is, moreover, hygroscopic, so that water present in the copolymer is absorbed.

A buffer vessel can be inserted between reactor 10 and filter-drier 20. This is advantageous if the copolymerization is carried out continuously. Alternatively, one or more reactors can be fitted in which a separate treatment (de-ashing) for the removal and/or recovery of catalyst is performed De-ashing can possibly also be carried out in the filter-drier.

Although in the description with reference to FIG. 1 the use of methanol as solvent is mentioned, the process according to the invention is not limited to this solvent. Any solvent that is suitable for solving the problem in question can be employed. The primary requirement is for a good solvent for oligomers and low-molecular products, including aliphatic alcohols such as butanol-1, butanol-2, isobutanol, n-propanol, isopropanol, n-heptanol, isopentanol, n-pentanol, hexanols, octanols and the like, furan, tetrahydrofuran, dioxane and substituted dioxanes, ketones such as methyl isobutyl ketone, methyl ethyl ketone, ethyl isobutyl ketone, ethyl isooctyl ketone, acetone and acyl acetone, ethers such as diethyl ether, dimethyl ether, methyl hexyl ether, ethyl butyl ether, esters such as ethyl or methyl acetate, nitriles such as acetonitrile and saturated hydrocarbons such as pentane, isopentane, hexanes, heptanes, octanes, and decanes. It is, moreover, certainly not necessary to use as washing agent the same organic liquid as was used as copolymerization medium.

The polymer is washed under conditions effective to reduce the amount of impurities in the copolymer. The conditions effective to reduce the amount of impurities will necessarily change according to the choice of washing agent. Washing is preferably carried out at temperatures of 10° to 80° C., or at lower temperatures, depending on the boiling point of the washing liquid. Contact times may vary from 5 min. to 1 hour or even longer. Drying of the copolymer should preferably be thorough enough to reduce the residual content of washing liquid in the copolymer to below 0.5%w, most preferably to below 0.2%w.

The invention also relates to linear alternating copolymers of carbon monoxide, ethylene and possibly other copolymerizable monomers, these copolymers being characterized by a combined content of not more than 3%w of: (a) water, (b) organic solvent and (c) by-products obtained during copolymerization which on heating of the copolymer to its melting point, escape in gaseous form. Copolymers so defined are novel. The total (a, b and c) impurity content of the copolymers according to the invention will preferably be less than 1.2%w or even better, less than 0.7%w. There is a particular preference for the group of products according to the invention which, in addition to the above-mentioned criteria, also have a maximum content of palladium catalyst residues, calculated as palladium metal, of $30 \times 10^{-4}$%w, most preferably less than $15 \times 10^{-4}$%w. The novel copolymers have a substantially improved stability at the melt temperature and they can be processed in commercially available degassing extruders or, in the preferred cases, even in ordinary extruders without any problems arising in connection with the escape of gaseous by-products.

EXAMPLE

An ethylene/CO copolymer was prepared in suspension in methanol with the aid of a catalyst obtained from palladium acetate, para-toluene sulfonic acid and a bidentate phosphine ligand according to the process of European patent application No. 121,965.

For comparison, the copolymer removed from the reactor was filtered off and dried by heating to 80° C. In this case, there was no purging with nitrogen.

Another sample of copolymer was washed according to the invention in methyl ethyl ketone in stirred suspension (750 ml to 50 g copolymer) for 1 hour at 40° C. under a nitrogen atmosphere. It was then filtered and dried by heating to 80° C. under dry nitrogen.

Both samples were weighed and a weight loss of 1.1%w was found for the sample according to the invention relative to the reference sample. This means that the reference sample contains 1.1%w of oligomer, soluble catalyst residues, water and residual methanol.

The catalyst residues, calculated as palladium metal and sulfur (from para-toluene sulfonic acid), in these two samples were 9 and 15 ppmw Pd, and 10 and 19 ppmw S.

What is claimed is:

1. A process for working up a linear alternating copolymer of carbon monoxide and ethylene which process comprises washing the copolymer in the absence of molecular oxygen with an organic solvent selected from the group consisting of aliphatic alcohols, ketones, ethers, nitriles and saturated hydrocarbons, separating the copolymer from the solvent and drying the copolymer at a temperature of at least (T-30)°C., wherein T is the boiling point of the solvent at room pressure, in the absence of molecular oxygen and in the absence of water.

2. The process of claim 1 wherein washing and drying are under a nitrogen atmosphere.

3. The process of claim 1 wherein washing is carried out batchwise.

4. The process of claim 1 wherein drying is carried out batchwise.

5. The process of claim 1 wherein washing and drying are carried out in a single unit.

6. A process for working up a linear alternating polymer of carbon monoxide, ethylene and propylene which process comprises washing the polymerin the absence of molecular oxygen with an organic solvent selected from the group consisting of aliphatic alcohols, ketones, ethers, nitriles and saturated hydrocarbons, separating the polymer from the solvent and drying the polymer at a temperature of at least (T-30)°C., wherein T is the boiling point of the solvent at room pressure, in the absence of molecular oxygen and in the absence of water.

7. The process of claim 6 wherein washing and drying are under a nitrogen atmosphere.

8. The process of claim 6 wherein drying the copolymer further comprises compressing the copolymer to reduce the solvent content.

9. The process of claim 8 wherein the drying is carried out in a single unit.

* * * * *